even if filed by itself at a location within the allowed range of 35° C. to 65° C. above the boiling point of the toluene diisocyanate, and that the proper solvent can be used in the process to obtain the desired results.

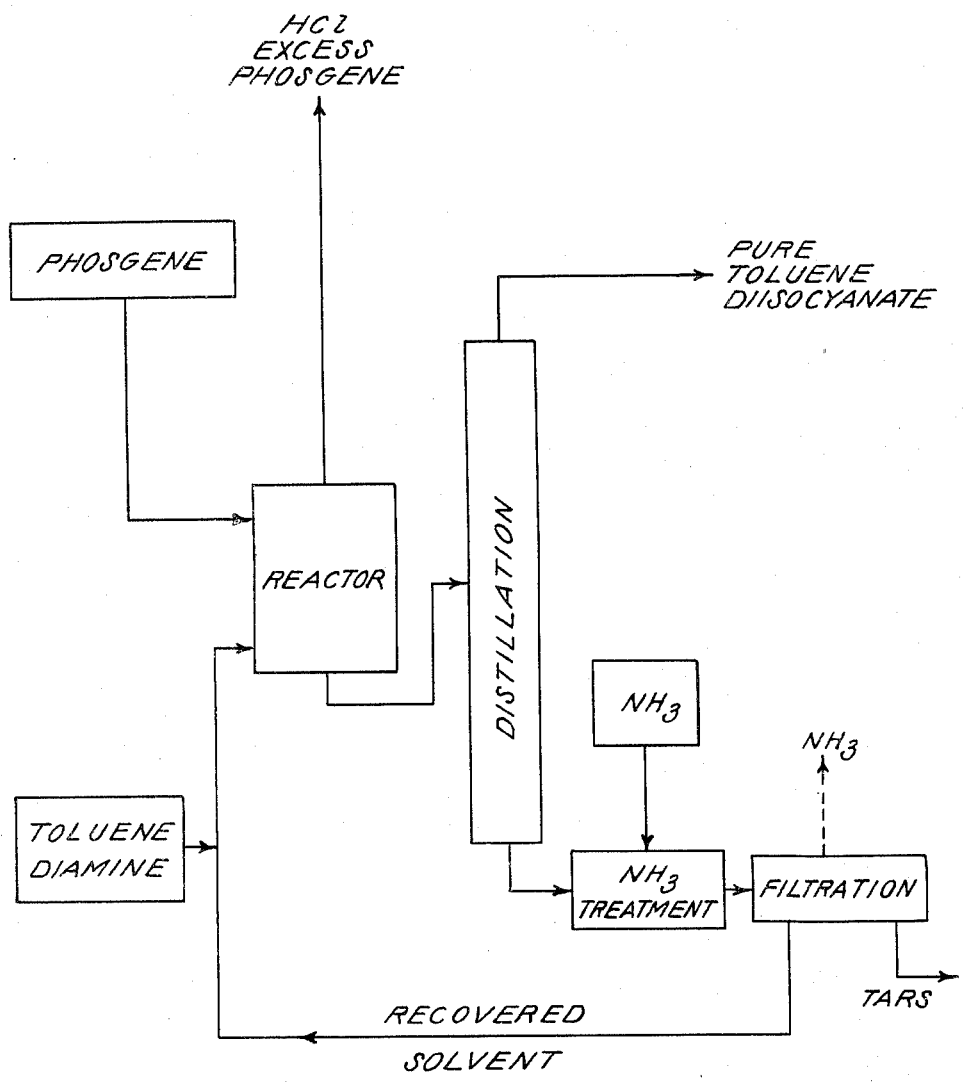

United States Patent Office
3,210,395
Patented Oct. 5, 1965

3,210,395
METHOD OF MAKING TOLUENE DIISOCYANATE
Robert B. McDougall, Shelton, Conn., assignor to United States Rubber Company, New York, N.Y., a corporation of New Jersey
Filed Apr. 16, 1962, Ser. No. 187,887
4 Claims. (Cl. 260—453)

This invention relates to the manufacture of toluene diisocyanate, and more particularly it relates to the manufacture of toluene diisocyanate by a process involving introducing a solution of toluene diamine in a chlorinated aromatic hydrocarbon solvent having a boiling point above the boiling point of toluene diisocyanate (251° C.), and phosgene in stoichiometric excess, into a reaction zone wherein the reactants are intensely mixed. The toluene diisocyanate thus formed in good yield is separated from the solvent and by-product tars in a high state of purity by fractional distillation. The preferred practice of the invention involves purifying the solvent by treating it with ammonia, filtering, and recycling the thus-purified solvent.

In the prior art process disclosed by C. F. Irwin, U.S. Patent 2,683,160, July 6, 1954, aromatic diisocyanates are made by reacting an aromatic diamine with phosgene under reflux conditions in a chlorinated aromatic solvent having a boiling point lower than the boiling point of the aromatic diisocyanate. In such a process, it is unfortunately found that great difficulties are encountered in attempting efficient separation of the product. Thus, when it is attempted to distill off the desired toluene diisocyanate from the reaction mixture it is found that the still residue soon becomes so viscous (due to the presence of by-product tars) that no further removal of toluene diisocyanate can be accomplished by simple distillation. Recovery of the remaining toluene diisocyanate from this residue involves the use of relatively elaborate and expensive techniques.

In the prior art process of T. R. Beck, U.S. Patent 2,822,373, Feb. 4, 1958, toluene diisocyanate is made by reacting toluene diamine and phosgene in a solvent medium (having a boiling point lower than that of the diisocyanate) under condition of superatmospheric pressure and extremely high turbulence. Unfortunately there is danger of leakage of toxic materials to the peril of the workmen in a factory using such a superatmospheric process. Furthermore, a very large recirculating pump is required, which is not only a considerable expense but also presents difficulties from the standpoint of maintenance and the possibility of leaks. Again, separation of toluene diisocyanate from the lower boiling solvent presents difficulties.

Flores, in U.S. Patent 2,680,129, June 1, 1954, describes two methods of preparing toluene diisocyanate. In the first method, a solution of toluene diamine in a high boiling solvent is fed into a reactor containing a solution of phosgene in the same solvent maintained at a temperature between −20° C. and +60° C. A solid intermediate product forms in the reactor. When all of the amine solution has been added, the reactor is heated to a temperature between 80° C. and 250° C. Gaseous phosgene is introduced to the reactor until all of the intermediate product has been consumed. The reaction mass is then vacuum distilled to recover the pure toluene diisocyanate. In the second method, anhydrous HCl is reacted with a solution of toluene diamine in a high boiling solvent. The slurry is then heated to a temperature between 80° C. and 250° C. and phosgene is introduced until all of the solid intermediate is consumed. The reaction mass is then vacuum distilled as in the first method. Both methods give at best a rather poor yield of toluene diisocyanate, calculated on a pure basis. Since both methods are two step and involve the formation of a solid intermediate, they are relatively slow and cumbersome, and therefore it has been desired to provide a more satisfactory process.

Slocombe, U.S. Patent 2,680,127, June 1, 1954, is like Flores in that he uses a two-step process, but he obtains an even poorer yield.

Irwin et al., U.S. Patent 2,757,183, requires two solvents, one high boiling and one low boiling. This adds to the separation problems and the plant investment in equipment. The yields are low. Furthermore, unless some provision is made for elimination of tars which collect in the reactor, the reactor soon becomes inoperable.

Accordingly, one object of the invention is to eliminate the difficult and expensive separation of toluene diisocyanate from the by-product tars, such as is necessary with certain prior art processes which use a solvent having a boiling point below that of toluene diisocyanate, viz., 251° C.

Another object is to obtain a good yield of substantially pure toluene diisocyanate.

Still another object is a reduction in the difficulty and cost of separating toluene diisocyanate from the reaction mixture.

It is yet another object of the invention to recover the solvent used in the process conveniently and efficiently, and recycle it.

The invention has for a further object the provision of an improved one-step, liquid-phase process which can be carried out continuously, or batchwise as desired.

Still a further object is the provision of a method which can be carried out at atmospheric pressure, without expensive or dangerous equipment.

The manner in which the invention accomplishes the foregoing objects, as well as additional objects and advantages, will be made manifest in the following detailed description, which is intended to be read with reference to the accompanying self-explanatory drawing, the single figure of which is a purely diagrammatic flow sheet illustrating one embodiment of the invention.

In accordance with the invention, toluene diamine and phosgene are reacted in a solvent having a boiling point far enough above the boiling point of toluene diisocyanate (251° C.) to permit an efficient separation to be effected between the solvent and the toluene diisocyanate at the conclusion of the reaction. For this purpose I prefer to use solvents having a boiling point at least about 35° above 251° C., and preferably at least about 65° above 251° C. The foregoing boiling point differences apply to the boiling points at atmospheric pressure. At reduced pressure, the boiling point differences become less, and at a pressure of 10 mm. of mercury, for example, a boiling point difference of at least 20° is ordinarily necessary, preferably at least 35° difference. For this purpose I employ a chlorinated aromatic hydrocarbon as the solvent. Among the operable solvents which may be used in the invention are the more highly chlorinated (i.e. higher boiling) biphenyls and naphthalenes, such as dichlorobiphenyl and higher polychloro biphenyls, as well as dichloro and higher polychloro naphthalenes. Penta-, and hexachlorobenzene may be used. Similarly pentachlorotoluene, as well as tri- and tetrachloroxylene may be used. Tetra- and pentachloroethylbenzene, and any other similar polychlorinated aromatic solvents which have the boiling point requirements previously stated, may similarly be used. These chlorinated aromatic materials have the required stability and solubility characteristics.

Particularly preferred solvents are the polychlorobiphenyls substantially free from monochlorobiphenyl. Monochlorobiphenyl, which has a combined chlorine content of 18.8% by weight, has a boiling point too close to that of toluene diisocyanate to be used in the present invention. It would not as a practical matter be possible to effect sufficient separation of this solvent and the desired toluene diisocyanate. It should be pointed out that toluene diisocyanate must be produced in a high state of purity (99.5%), otherwise it is not marketable. The more highly chlorinated biphenyl, dichlorobiphenyl, which has a combined chlorine content of 31.8% by weight, has a sufficiently high boiling point to make it possible to separate pure toluene diisocyanate in the process of the invention, but commercial grades of this solvent which contain the undesirable lower-boiling monochlorobiphenyl are not suitable as such.

The boiling points of monochlorobiphenyl and dichlorobiphenyl isomers, in comparison to toluene diisocyanate, at atmospheric pressure and reduced pressure, are given in the following table:

| Chemical | Boiling point, ° C. | |
|---|---|---|
| | Reduced pressure (10 mm. of Hg) | Atmospheric pressure |
| Toluene diisocyanate | 120 | 251 |
| 3,3'-dichlorobiphenyl | 169 | 322-4 |
| 4,4'-dichlorobiphenyl | 165 | 315-9 |
| Ortho monochlorobiphenyl | 124 | 267-8 |
| Meta monochlorobiphenyl | 139 | 284-5 |
| Para monochlorobiphenyl | 137 | 282 |

It will be seen that the various isomers of monochlorobiphenyl boil at temperatures from 4 to 19° C. above the boiling point of toluene diisocyanate at a pressure of 10 mm. of mercury.

It will be understood that the ordinary commercial chlorinated biphenyls are not pure chemicals and do not have sharp boiling points, but rather are mixtures of products of various chlorine contents and have a boiling point range with a span of many degrees. The commercial grade of chlorinated biphenyl having a chlorine content of about 32% has dichlorobiphenyl as a major constituent, but there is also considerable monochlorobiphenyl present, and therefore this commercial material cannot be used in the invention, especially since it is cumbersome and impractical to remove the monochlorobiphenyl from such a mixture. However, there is a commercial chlorinated biphenyl having a chlorine content of 42%, in which trichlorobiphenyl is the major constituent, and which contains only a small amount of monochlorobiphenyl that can be largely removed by a topping operation (that is, by vacuum distilling off a small quantity, e.g. 3 to 10% by weight, of the most volatile fraction), after which the solvent is suitable for use in the invention. More highly chlorinated commercial biphenyls may be used, e.g. tetrachlorobiphenyl and higher, with a vacuum topping operation to remove any monochlorobiphenyl present if necessary, but as the chlorine content increases the solvent usually becomes less desirable from an economic standpoint. The following table shows the relationships among various commercial grades of chlorinated biphenyl known as "Aroclor:"

component of any one grade is usually a mixture of the isomers of the compounds which has the chlorine content nearest to the chlorine content of that grade. As will be apparent from the foregoing discussion the grades designated 1242 and 1248 are the most preferred for use in the invention, provided they are first "topped" by distilling off a portion to remove the most volatile fraction. If the pure chlorinated biphenyls were available, dichlorobiphenyl and trichlorobiphenyl would represent the most preferred materials. By "pure" dichlorobiphenyl or trichlorobiphenyl I mean a material containing only dichloro isomers or trichloro isomers, respectively. The commercial grades designated 1221 and 1232 cannot be used in the invention because the monochlorobiphenyl present cannot be separated to give a toluene diisocyanate product of the requisite purity, as a practical matter. The grades designated 1254, 1260 and 1262 can be used in the invention, but are less preferred than 1242 and 1248.

In practicing the invention, the toluene diamine is dissolved in the solvent to provide a concentration between 1% and 15% by weight. Concentrations below 1% give high yields but require uneconomically large equipment and high utility loads. Concentrations above 15% give a poor yield of toluene diisocyanate. The preferred range is 1.5% to 2.5% toluene diamine. The toluene diamine employed may be the commercial grade which usually is a mixture of all six isomers. However, only the 2,4- and the 2,6-isomers react with the phosgene to form toluene diisocyanate. All other isomers are converted to tars. If desired, a single isomer may be used, such as 2,4-toluene diamine, or the mixed 2,4- and 2,6-isomers may be present in any proportions.

A stream of the toluene diamine solution is introduced continuously or in relatively frequent small increments into a reaction vessel which contains the same solvent. Simultaneously or alternately, phosgene is introduced into the reaction solution continuously or in relatively frequent small increments, in sufficient quantity to provide a minimum of 3 moles or 1.5 times the stoichiometric quantity of phosgene to react with the amine as exemplified by the following equation, representing the reaction of the 2,4- isomer (in practice all six isomers may be present although, as indicated, only the 2,4- and 2,6- isomers react in the desired manner):

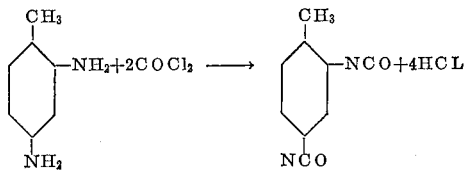

The preferred range of phosgene charged is 1.8 to 2 times the stoichiometric amount, that is, 3.6 to 4 moles of phosgene for each mole of toluene diamine. Phosgene addition rates of over 4 or 5 moles per mole of toluene diamine operate very well but are unnecessary and involve a slight economic penalty due to recoverying a large quantity of unreacted phosgene.

The mixture in the reaction vessel is kept well agitated, and the reactor volume should be large enough to provide a very rapid dilution of the incoming toluene diamine stream. Particularly intense agitation is required if the reactor volume is small. If the dilution rate of

| Trade Number "Aroclor" | Combined chlorine, percent | Boiling point range at atmos. press.,° C. | Nearest pure chloro-biphenyl comp. (prefix of name) | Chlorine atoms per molecule | Combined chlorine in nearest pure chloro-biphenyl, percent |
|---|---|---|---|---|---|
| 1221 | 21 | 275-320 | Monochloro | 1 | 18.8 |
| 1232 | 32 | 290-325 | Dichloro | 2 | 31.8 |
| 1242 | 42 | 325-360 | Trichloro | 3 | 41.3 |
| 1248 | 48 | 340-375 | Tetrachloro | 4 | 48.6 |
| 1254 | 54 | 365-390 | Pentachloro | 5 | 54.3 |
| 1260 | 60 | 385-420 | Hexachloro | 6 | 58.9 |
| 1262 | 62 | 400-430 | Heptachloro | 7 | 62.8 |

Each grade of the above series actually contains chlorobiphenyls of all levels of chlorine content and all of the various isomers of each chlorine level. The major the toluene diamine is not rapid, the yield of toluene diisocyanate will be seriously reduced.

On starting up the process initially, the reactor will ordinarily contain solvent with no toluene diisocyanate therein. The toluene diisocyanate concentration will gradually increase to the level determined by the yield and the concentration of toluene diamine in the feed solution. On later startups the reactor will typically contain the reaction mass produced at some earlier time.

The temperature of the reaction mass is maintained below the boiling point of toluene diisocyanate, that is, at a temperature of from 110° C. to 250° C. It is maintained preferably at a temperature in the range of 200° C. to 210° C. which gives the best yields. Hydrogen chloride is evolved and passes out of the reactor.

In the course of the process a portion of the reaction mixture is withdrawn continuously or in frequent small increments. This material contains the solvent, by-product tars, and the desired toluene diisocyanate. To recover the toluene diisocyanate the mixture is distilled preferably at reduced pressure through a fractionating column, the toluene diisocyanate passing off overhead, and the solvent and by-product tars remaining behind. This makes possible a remarkably efficient removal of toluene diisocyanate of high purity from the crude reaction mixture, in excellent yield.

An important feature of the process resides in the subsequent treatment of the residue of the crude reaction mixture after separation of the toluene diisocyanate therefrom. In accordance with the invention, the still residue containing the solvent and by-product tars is treated with anhydrous ammonia. This treatment results in a remarkable precipitation of the bulk of the by-product tars which are then easily substantially removed by filtration. The treatment is effected simply by bubbling a stream of anhydrous amomnia into the still residue, preferably while it is at an elevated temperature (e.g., 100°–300° C. or higher). It is believed that the anhydrous ammonia reacts with isocyanate groups on the tars to form insoluble ureas. The tars are ureas which are soluble in the solvent before treatment with ammonia. High temperatures favor this reaction. Good precipitation is obtained at about 250° C., for example. The time required for the treatment with ammonia is not critical and will depend in any given case on such variables as the size of the batch, the temperature, and the nature of the equipment. About ¼ hour is usually adequate, during which time only a very small trace of ammonia is actually absorbed (typically the weight of the solution increases less than 0.1% during the treatment, and not all of this represents ammonia which has actually reacted). The excess or unreacted ammonia may be removed from the solvent by any convenient method, such as by blowing an inert gas through the solvent, but this is not essential in all cases since there is a tendency for the ammonia to simply pass off during the filtration. After filtration the solvent is sufficiently pure to be used over again, that is, it is recycled, with a fresh charge of toluene diamine, into the reaction vessel once again. Any small quantity of tar remaining in the solvent does not have significant effect on the process. In this way a given quantity of solvent serves to produce an indefinitely large quantity of toluene diisocyanate.

The following examples will serve to illustrate the practice of the invention in more detail.

Example 1

The reaction is carried out in a 500 ml. flask equipped with a high speed, 1700 r.p.m. agitator, subsurface addition tubes for phosgene and amine solution, and a constant level takeoff arm. The amine solution is fed from a 5,000 ml. heated storage tank through a positive displacement pump to the reactor. Phosgene is fed from a cylinder through a rotameter to the reactor. The reaction mass overflows from the reactor into a 5,000 ml. receiver. The off gases from the reactor are absorbed in a caustic scrubber.

The following operating procedure was followed:

(1) 120 grams of 2,4-toluene diamine was dissolved in 5880 grams of "Aroclor 1242" (chlorinated biphenyl containing 42% chlorine by weight) maintained at 100° C. in the feed tank.

(2) 9 grams of toluene diisocyanate was dissolved in 351 grams of "Aroclor 1242" in the reactor.

(3) The solution in the reactor was saturated with phosgene at a temperature of 200° C.

(4) All of the toluene diamine solution was pumped into the reactor at a uniform rate over a period of seven hours. A phosgene flow 1.8 times the stoichiometric quantity was maintained throughout the addition of toluene diamine and for ten minutes thereafter. Throughout the addition, the reactor temperature was between 200° C. and 205° C.

(5) The entire reaction mass was transferred to a 5,000 ml. still where it was distilled through a packed fractionating column at a pressure of 10 mm. of mercury. One-half the charge containing all of the toluene diisocyanate was collected as a distillate. This distillate was assayed for toluene diisocyante and the total toluene diisocyanate produced was calculated. The yield was 93% of the theoretical quantity based on the weight of the toluene diamine.

(6) The residue in the still was heated to 250° C. and anhydrous ammonia was bubbled in for 15 minutes. The tar precipitated from the solution.

(7) The solution was filtered through filter paper to yield a tar cake and a clear solvent suitable for reuse in the reaction.

Examples 2–18

The procedure of Example 1 was followed in 17 more runs, with variations as noted in the following table, which also summarizes Example 1. In the table "TDA" stands for toluene diamine and "TDI" stands for toluene diisocyanate. The solvent in all cases was commercial chlorinated biphenyl (various grades of "Aroclor"), containing various proportions of combined chlorine as indicated in the table.

*Summary of examples*

| Example No. | Concent. of TDA in feed, percent | Amt. of TDA fed, grams | TDI added to reactor, grams | Chlorine in the solvent, percent | Boiling range of solvent, ° C. | Reaction Temp., ° C. | Phosgene excess, percent | Yield of TDI, percent |
|---|---|---|---|---|---|---|---|---|
| 1 | 2 | 120 | 9 | 42 | 325–360 | 200 | 80 | 93 |
| 2 | 2 | 120 | 9 | 42 | 325–360 | 200 | 100+ | 92 |
| 3 | 4 | 160 | 18 | 42 | 325–360 | 200 | 100+ | 89 |
| 4 | 6 | 120 | 0 | 42 | 325–360 | 200 | 100+ | 88 |
| 5 | 8 | 160 | 0 | 42 | 325–360 | 200 | 100+ | 87 |
| 6 | 12 | 240 | 0 | 42 | 325–360 | 200 | 100+ | 82 |
| 7 | 15 | 300 | 0 | 42 | 325–360 | 200 | 100+ | 75 |
| 8 | 8 | 160 | 45 | 42 | 325–360 | 200 | 100+ | 84 |
| 9 | 8 | 160 | 0 | 48 | 340–375 | 200 | 100+ | 82 |
| 10 | 8 | 160 | 0 | 42 | 325–360 | 200 | 100+ | 87 |
| 11 | 8 | 160 | 0 | 32 | 290–325 | 200 | 100+ | 90 |
| 12 | 8 | 160 | 0 | 21 | 275–320 | 200 | 100+ | 88 |
| 13 | 8 | 160 | 0 | 42 | 325–360 | 110 | 100+ | 75 |
| 14 | 8 | 160 | 0 | 42 | 325–360 | 170 | 100+ | 81 |
| 15 | 8 | 160 | 0 | 42 | 325–360 | 190 | 100+ | 83 |
| 16 | 8 | 160 | 0 | 42 | 325–360 | 200 | 100+ | 87 |
| 17 | 8 | 160 | 0 | 42 | 325–360 | 210 | 100+ | 87 |
| 18 | 8 | 160 | 0 | 42 | 325–360 | 230 | 100+ | 85 |

In Examples 1, 2, 3 and 8 a calculated amount of toluene diisocyanate was added to the start of the run in order to better simulate continuous plant operation. However, this is unnecessary and in fact undesirable in commercial practice since the addition of toluene diisocyanate to the reactor tends to reduce the yield due to formation of substituted ureas by reaction of toluene diamine with the toluene diisocyanate. In commercial operation the solution in the reactor of course would have a certain relatively constant concentration of toluene diisocyanate after the process is underway, regardless of whether any toluene diisocyanate was added initially.

The yield figures given are corrected for the purity of the product. The combined chlorine content of the solvent has an effect on the yield as well as on the quality of the product. The commercial chlorinated biphenyl containing 32% chlorine tends to give the highest yield but unfortunately it gives a relatively impure product and is therefore outside the scope of this invention. This low purity results from the large quantity of relatively low boiling monochlorobiphenyl in this commercial solvent. The commercial solvent having a 21% chlorine level gives an even lower purity (typically under 50%) and is also outside the scope of this invention. In contrast, a purity of 98.5% can be obtained with the 42% chlorinated commercial solvent (which contains only about 0.15% monochlorobiphenyl). This can be increased to 99.9% by removing a small portion of the solvent in a vacuum topping operation. The 42% commercial chlorinated biphenyl solvent, after topping, is preferred. The commercial chlorinated biphenyl containing 48% chlorine gives a lower yield than the 42% chlorinated commercial solvent. It is therefore a less desirable solvent. In general the commercial chlorinated biphenyls containing about 42% to about 62% chlorine may be used, but those containing about 42% to about 48%, are preferred, especially after topping. In terms of the pure solvents, dichlorobiphenyl (31.8% chlorine) and trichlorbiphenyl (41.3% chlorine) would be preferred.

Having thus described my invention, what I claim and desire to protect by Letters Patent is:

1. A method of making toluene diisocyanate comprising providing a solution of toluene diamine in a solvent consisting of chlorinated aromatic hydrocarbon having a boiling point substantially in excess of the boiling point of toluene diisocyanate, said solution containing from 1% to 15% by weight of said diamine, introducing said solution into a reaction vessel containing said solvent, concurrently introducing phosgene at such a rate as to provide from 3 to 5 moles of phosgene for each mole of toluene diamine, agitating the liquid mixture in said reactor while maintaining it at atmospheric pressure and at a temperature of from 110° C. to 250° C. throughout said introduction of said diamine solution and said phosgene, withdrawing from the reactor a liquid mixture containing toluene diisocyanate, the said solvent, and by-product tars, fractionally distilling the mixture to remove overhead the toluene diisocyanate, leaving behind a still residue containing the solvent and by-product tars, passing ammonia into the said residue to precipitate the tars, filtering the mass to separate the solvent from the tars, and recycling the solvent to the start of the process.

2. A method as in claim 1 in which the said solvent is a polychlorobiphenyl.

3. A method as in claim 1 in which the said solvent is dichlorobiphenyl.

4. A method as in claim 1 in which the said solvent is trichlorobiphenyl.

References Cited by the Examiner

UNITED STATES PATENTS

| | | | |
|---|---|---|---|
| 2,680,129 | 6/54 | Flores | 260—453 |
| 2,683,160 | 7/54 | Irwin | 260—453 |
| 2,757,183 | 7/56 | Irwin et al. | 260—453 |

CHARLES B. PARKER, *Primary Examiner.*